Jan. 28, 1969   D. BARRON   3,423,836
SONAR RAY PLOTTER
Filed Oct. 23, 1965
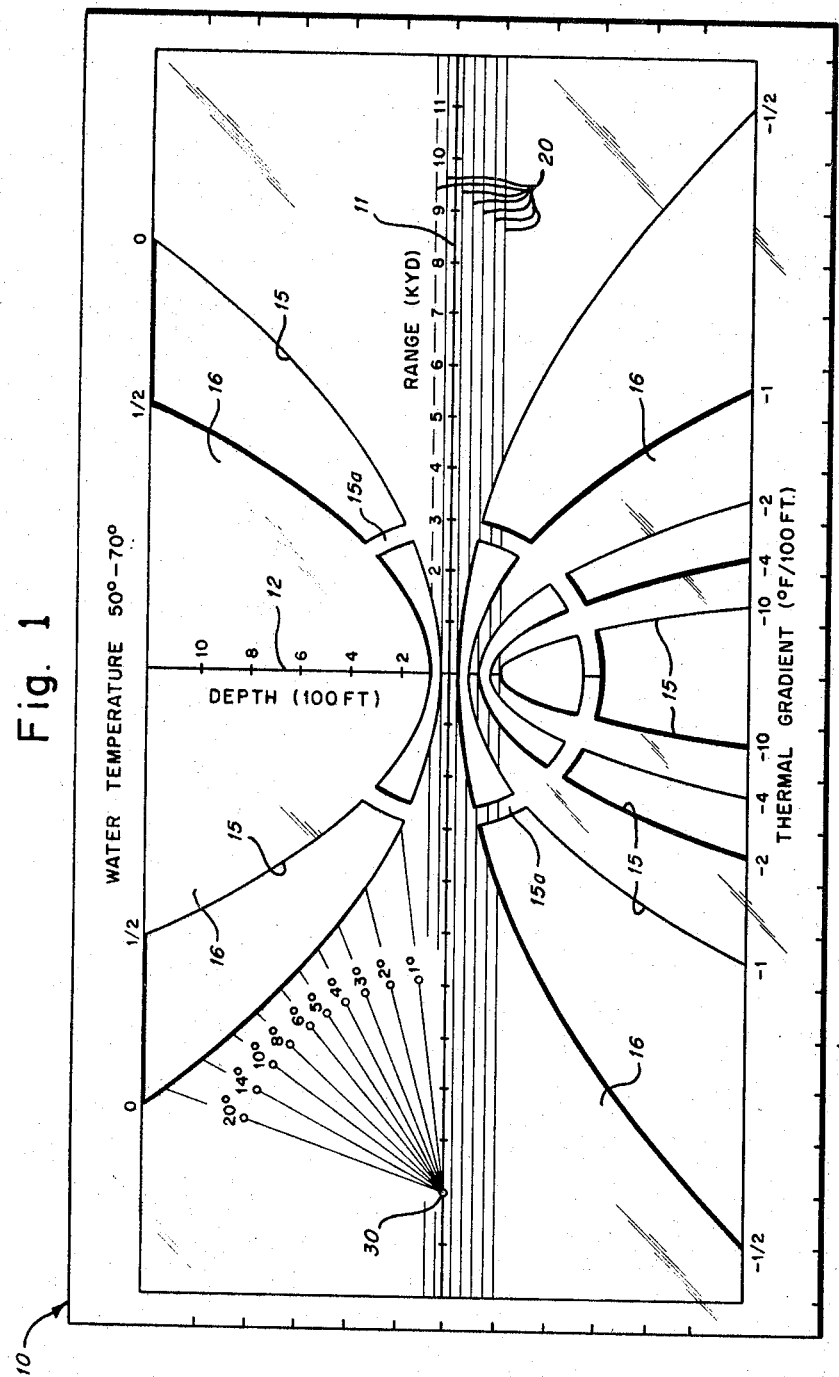
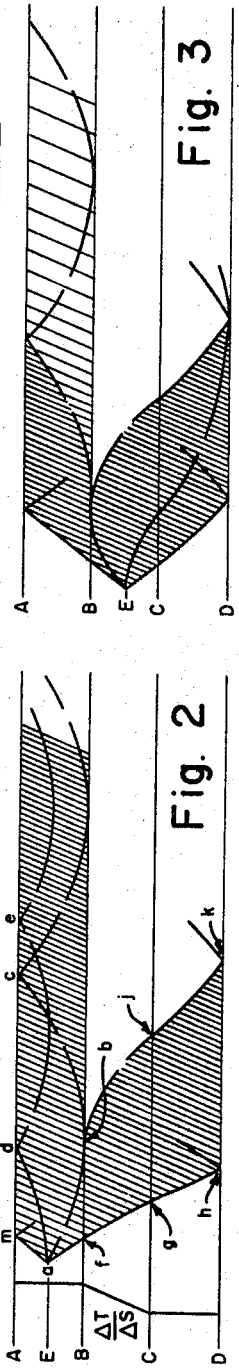
INVENTOR
DANIEL BARRON United States Patent Office 3,423,836
Patented Jan. 28, 1969

3,423,836
SONAR RAY PLOTTER
Daniel Barron, Philadelphia, Pa.
(6223 Springhill Court, Apt. 202, Greenbelt, Md. 20770)
Filed Oct. 23, 1965, Ser. No. 502,862
U.S. Cl. 33—1                                 3 Claims
Int. Cl. C06g 1/10; G01s 3/00; G01c 21/20; G01v 1/30

ABSTRACT OF THE DISCLOSURE

A template for plotting the paths of acoustic rays in a body of water in which a template having curved slots formed therein representative of the path of an acoustic ray in a body of water for a particular rate of change in the temperature of the body of water per unit of depth is used as a guide in the plotting of the ray path.

---

The present invention relates to drafting instruments and more particularly to an improved drawing or template aid for plotting the path of a sound ray in a liquid medium.

One method for detecting and locating underwater targets embodies a helicopter equipped with airborne sonar equipment and a transducer having a 500-foot cable length cooperating therewith, the transducer thereby having the capability of being dipped below the surface of the water at various depths. One of the most important functions of the sonar operator is to determine how deep to dip the transducer in order to obtain the maximum area of coverage, more correctly termed—volumetric coverage. Obviously, the proper initial positioning of the transducer will provide the underwater target with the least chance of escaping detection.

In order to determine the proper tactics, for example, localization, search, or formation (terms known in the art), for the detection of the underwater target it is important that the sonar operator knows the estimated sonar range (ESR) of the transducer when the same is operating at a particular depth. The ESR is defined as the range which will give percent probability of detecting a target.

It is known that the behavior of sound in sea water, and therefore the performance of sonar equipment, is dependent among other things upon the temperature condition in the body of water in which the detection operation is taking place. The temperature condition in turn is dependent upon the depth to which reference is being made, the pressure effect at this depth and the surface temperature. Each of these factors is important in the determination of the best depth to operate the sonar equipment and in the prediction of the range which will be obtained when operated at this depth. Presently, sonar operators either have the use of a bathythermograph (BT) which automatically measures the water temperature as a function of depth and provides a record which is called a bathythermogram or, alternatively, have previously obtained BT profiles for the particular area over which the helicopter is operating.

Given the data from the BT recorder or from the prior profiles, the operator subjectively chooses the depth at which the transducer is to be located and additionally subjectively estimates the range which is to be expected from the transducer at the selected depth. To aid this subjective analysis, the operator may refer to charts and previous data, if available.

A more objective method employs the use of a sonar slide rule of the type described in copending application Ser. No. 461,227 field May 28, 1965.

Still another objective method employed by the operator involves ray plotting. In this latter method an actual diagram is made of the sonar ray path. This diagram gives a picture of the paths of sound in and below the surface isothermal layer, the amount of refraction, reflection bounces, the inclination of the sound path which is refracted downward, the shadow zone, the depth of an initial contact for a particular range below the surface layer, and other information. The plotted ray path is that of the "limiting ray" which is the ray which bounds the area of ensonified water in the thermocline, and is the ray that is used for range prediction.

In the past, in order to obtain a visual picture of the ensonified area, the paths of sound rays in the ocean were plotted by the free hand method, by conventional drafting curves, i.e. French curves, or by sophisticated electronic x-y plotters. These methods resulted in visual presentations which were either too inaccurate, required too much complex equipment, or were too time consuming for practical use.

These problems are solved or minimized by the present novel ray plotter which enables the sonar operator to rapidly obtain an accurate presentation of the area and volumetric coverage of the sound rays as they propagate through the ocean, and of the best depth to place a variable depth transducer to obtain maximum coverage. The plot can be used to predict ranges between the transducer and at the target for various oceanographic conditions and to determine the depth of the target.

It is an object of the present invention to provide a sonar ray plotter for plotting the path of sonar rays from a sonar projector.

Another object of the present invention is to provide a drafting template for obtaining an accurate ray plot of the sound path in water.

Still another object is to provide a template for obtaining a ray plot of the sound emanating from a source for various angles thereof and for various layer conditions, and temperature gradients.

Another object of the present invention is to provide a sonar ray plotter for making a plot for determining the best depth to operate a transducer in the detection of underwater targets.

A still further object of the present invention is to provide a sonar ray plotter for making a plot for determining the best depth at which a transducer should be operated for the determination, detection and localization of an underwater target and which will additionally provide information as to the range which may be expected from the transducer when the same operates at the selected depth.

Still another object of the present invention is the provision of a lightweight, compact, inexpensive sonar ray plotter capable of quickly and accurately providing information as to the best depth to operate a sonar transducer during the detection of underwater targets.

A further object of the present invention is to provide a sonar ray plotter for making a plot which will quickly and accurately provide information as to the best depth to operate a deep-dipped sonar transducer during the location, detection and classification of underwater targets and to quickly and accurately provide information as to the range which may be expected to be obtained when the same is operated at that selected depth.

An additional object is to provide a sonar ray plotter which will quickly and accurately determine the depth of the underwater target.

Various other objects and advantages will appear from the following description of an embodiment of the invention, and the novel features will be particularly pointed out hereinafter in connection with the appended claims.

In the drawings:

FIG. 1 illustrates a front elevation view of the sonar ray plotter.

FIG. 2 is a typical plot, obtained through use of the invention, of sonar rays for the BT condition illustrated (which is typical) for a transducer placed in the layer.

FIG. 3 is typical schematic plot, obtained through use of the invention, of sonar rays for a transducer placed in the thermocline. In the illustrated embodiment of the invention and with particular reference to FIG. 1, there is shown at 10 the sonar ray plotter or template comprising a body made of a thin sheet of transparent plastic material such as "Plexiglas" or other similar material of which drafting instruments of the general nature are usually made.

The body 10 is divided into upper and lower portions by a horizontal range scale line 11 appropriately divided and marked in kiloyards (kyd.) and representative of range. A vertical depth scale line 12 divides the upper portion into two quadrants and is appropriately marked in one hundred (100) foot units representative of depth. Each of the aforesaid divisions are additionally marked on the marginal edges of the body 10.

On this body 10, a series of curves are plotted symmetrically about vertical depth scale line 12 which represent the paths of sound rays through water for various thermal gradients (rate of change of temperature with depth)—here illustrated as ½, 0, —½, —1, —2, —4, —10. The particular ray plotter illustrated is for sea water temperature having a range between 50° to 70° F. The curves represent the actual path of acoustic rays (sound beams) for rate of temperature change per 100 feet in this body of water and the rate is illustrated by numerals or indicia located on the body 10 at the terminus of each curve. Those curves positioned above the horizontal range scale line 11 are for positive gradients while those curves positioned below the line 11 are for negative gradients. The method utilized for plotting these constant gradient curves employs Snell's Law and may be obtained from any standard text. For example, see "Fundamentals of Sonar" by J. W. Horton, published by the U.S. Naval Institute in 1957.

It should be understood that only representative gradient curves (½°, 0°, —½°, —1°, —2°, —4°, —10° F./100 ft.) are illustrated and that more or less curves could be provided without departing from the spirit of the invention. Similarly, although the template 10 illustrates those curves for the 50° to 70° temperature range, a template embodying curves for sea water temperature ranges of from freezing to 50° F. and another from 70° to 90° F. could also be constructed.

In order to facilitate the drawing or plotting of the various curves by insertion of a pen, pencil point or similar instrument, the body 10 has excised portions or slots 15 formed between alternate pairs of curves. Ribs 15a of the body 10 interrupt the slots 15 at periodic intervals to provide structural support for the remaining curved members 16.

A series of horizontal lines 20 tangent to each of the thermal gradient curves at the apex thereof is indicated on the body 10 and act to facilitate the plotting, as will be discussed below.

The drafting aid for drawing the limiting beam width angle of the particular transducer being utilized is found in the upper left quadrant of the template 10. This aid embodies a center point or dot 30 located on the horizontal range line 11 and in the form of a small opening through the body 10, just large enough to insert a pen or pencil point therethrough and a series of similar remote points or dots spaced at angular intervals beginning at the horizontal line 11 which serves as the base line for measuring the beam width angle. Lines are drawn between the center point 30 and the remote points and appropriate indicia are placed adjacent thereto. Although the beam width angles on the template appear larger than that indicated thereon, that is, the angle between the 0° line (horizontal range line) and the 8° line appears far greater than an 8° value; it should be understood that the graphical presentation of the angle is adjusted to compensate for an abscissa in kiloyards and an ordinate in feet.

Referring now to FIG. 2, there is illustrated therein a typical ray plot obtained by the utilization of the novel sonar ray plotter of the present invention. The plotter is normally used together with information obtained from the bathythermograph to obtain the desired plot. On the situation of FIG. 2, the BT provides a reading indicated at 40 which shows that an isothermal layer exists between the surface A and depth B, the isothermal layer being a layer of water where there is no change in temperature with depth. A similar isothermal layer exists between depth C and the bottom surface D of the body of water and a negative gradient layer, which is a negative rate of change of temperature with depth, exists between depth B and depth C.

*Plotting*

In the actual plotting of the sonar ray paths, horizontal lines are drawn on the graph paper representing the water surface A, the boundary of the isothermal layer B, the boundary of the next layer C, and the bottom of the ocean D in accordance with the information from the BT. In the instance of FIG. 2, where the sound source or transducer is placed in the isothermal layer at a depth E and it is desired to plot the limiting rays, the depth location of the sound source is marked at "a" and the template 10 is placed so that the vertex of the 0° curve (commonly referred to as the isothermal curve) touches the surface B at "b" and the curve passes through the mark "a." The curve is then traced and extends from transducer mark "a" to the point "c" on surface A thereby providing arc "abc." In order to show the bounces that occur at the surface of the water, the template 10 is moved over until the isothermal curve (0°) intersects point "c" and the tangent line 20 of the isothermal curve touches the vertex of the previously drawn curve or arc "abc." The curve or arc is then drawn. This is continued for as many bounces as is desired, always making sure that the tangent line 20 of the isothermal curve is tangent to the vertex of the preceding curve or arc.

The curve or arc "ad" which is representative of one of the family of rays emanating from the source is plotted by placing the isothermal curve of the template 10 at the source mark "a" and tracing the curve until it intersects surface A, this occuring at point "d." The bounce from the water surface A is drawn by then placing the isothermal curve of the template at mark "d" with the tangent line 20 of the isothermal curve tangent to the vertex of the preceding curve or arc. In this instance the vertex is at the source mark "a."

In order to trace the upper and lower rays "am" and "af" respectively, which are limited by the beam width of the particular transducer selected, the opening 30 on the template 10 is placed on the transducer mark "a" (while maintaining the template horiontally) and a mark is made by pencil point or the like at the aperture adjacent the beam width angle indicia, the beam width being a known characteristic of the sound source. A line is then drawn from the source mark "a" toward the beam width mark until the line intersects the surface A, as at "m," thereby providing curve "am." The template is then turned 180° and the above procedure repeated. This will provide curve "af."

The curve or arc "fg," a continuation of "af" is obtained by selecting the proper negative gradient curve (obtained from the BT), holding the template in the horizontal position, matching up the negative gradient curve until it is tangent to arc "ef" at "f" and then drawing the arc "fg."

The arc "gh" which is a continuation of arc "fg" is obtained by using the isothermal curve since the layer between surfaces C and D is an isothermal layer. Holding the template in the horiontal position, the isothermal curve is positioned tangent to arc "fg" at "g" and the arc "gh" is drawn until it intersects surface D.

Next, to draw the limiting ray "bj" the proper negative gradient curve of the template is selected in accordance with the BT indication and the template is positioned with the vertex of the selected negative gradient curve touching the surface B at point b. The arc "bj" is then drawn and terminates at surface C.

The ray is continued into the next layer (isothermal) by positioning the isothermal curve tangent to arc "bj" at "j" and the arc "jk" is drawn until it intersects surface D.

As may be viewed in FIG. 2, the ensonified area is limited by the limiting rays and is shown cross-hatched. The non cross-hatched areas indicate areas of weak or no ensonification thereby putting the operator or plotter on notice that a target in this area could escape detection.

Using basically the same technique as that described above, a plot of the sound rays can be obtained for the situation in which the transducer is located in the gredient rather than in the isothermal layer. Such a plot is shown at FIG. 3, a description of which is not considered necessary in view of the extended discussion above.

In addition to the plotting as described above, the template 10 also may be utilized to determine the optimum depth at which a given sound source should be placed in order to obtain the maximum volumetric sonar coverage in a negative gradient layer. This is accomplished by drawing horizontal lines on the graph paper representing the upper and lower boundaries of the negative gradient layer. The proper negative gradient curve at the template is selected in accordance with the BT indication and the template is positioned with the vertex of the selected negative gradient curve being the point of tangency to the horizontal upper boundary line. The curve is then traced from the horizontal lower boundary line to the upper boundary line and then back down to the lower boundary line. The beam width line representing the beam width angle of the given sound source and emanating from opening 30 is then selected. Maintaining horizontal line 11 of template 10 parallel to the drawn horizontal boundary lines the selected beam width line is positioned on the traced curve such that the selected beam width line is tangent to some point on the traced negative gradient curve. The point of tangency is representative of the optimum depth at which the given sound source should be placed to obtain maximum volumetric sonar coverage.

It will be understood that various changes in the details, materials, steps and arrangement of parts which have been herein described and illustrated in order to explain the nature of the invention, may be made by those skilled in the art within the principle and scope of the invention as expressed in the appended claims.

What is claimed is:

1. A drafting aid template for plotting the paths of acoustic rays in a body of water having a particular temperature range, the acoustic rays emanating from a given sound source, comprising:

a body of transparent stock having flat parallel upper and lower surfaces and side edges;
a first visible line parallel to one of said side edges;
a second visible line normal to said first visible line and intersecting said first visible line;
a first slot formed substantially the entire extent thereof by the contour of two separate curves, each on an opposite face of said slot, said separate curves being arranged symmetrically about said second visible line;
a second plurality of spaced slots, each slot formed substantially the entire extent thereof by the contour of two separate curves, each on an opposite face of said slot, said curves being arranged symmetrically about said second visible line;
a plurality of lines parallel to each other and parallel to said first visible line and tangent to each of said curves at their vertex;
said slots serving as guides for transferring the curve configuration to another surface;
said curves of said first plurality of slots being representative of the path of an acoustic ray in the body of water for a particular positive rate of change in the temperature of the body of water per unit of depth;
said curves of said second plurality of slots being representative of the path of an acoustic ray in the body of water for a particular negative rate of change in the temperature of the body of water per unit of depth;
and a plurality of angularly spaced lines emanating from said first visible line and representative of the beam width angle of the given sound source.

2. The template as defined in claim 1 further including:
a first visible index scale marked on said first visible line having scale graduations indicative of range;
a series of graduations marked on said body adjacent to one of said side edges corresponding to the graduations on said first visible index scale;
a second visible index scale marked on said second visible line having scale graduations indicative of depth;
a series of graduations marked on said body adjacent to other of said side edges corresponding to the graduations on said second visible index scale.

3. The template as defined in claim 2 further including:
numerical indicia correspondingly identifying the gradient value of each of said curves.

References Cited

UNITED STATES PATENTS 2,906,023    9/1959    Fisher _____ 33—1
2,933,818    4/1960    Palmer _____ 33—174

WILLIAM D. MARTIN, JR., *Primary Examiner.*

U.S. Cl. X.R.
33—174, 111